Patented Oct. 22, 1935

2,018,355

UNITED STATES PATENT OFFICE 2,018,355

COMPOSITION OF MATTER FOR THE MANUFACTURE OF ARTIFICIAL STONE

Charles H. Hagopian, New York, N. Y.

No Drawing. Application December 1, 1933,
Serial No. 700,568

2 Claims. (Cl. 106—29)

This invention relates to the manufacture of artificial stone, such as marble, and the production of articles therefrom, and it is the object of the invention to provide an improved composition of matter for the manufacture of artificial stone and the producing of articles therefrom, as by molding, such as plates or slabs to be used as tiling, blocks and trays, desk sets, etc., and to provide an article having a highly polished or glazed surface without requiring the necessity of a supplemental polishing after the article is taken from the mold and which will not crack during or after setting and curing of the article, and which will not effloresce with a resultant destruction thereof.

In carrying out the invention I provide a mixture "A" consisting of casein, calcined magnesite, a hydrous silicate such as talcum or soapstone and an inert substance or material, such as sand or marble dust, in the proportions approximately of two pounds of the casein, two pounds of talcum or soapstone, seventeen pounds of calcined magnesite and four pounds of sand or marble dust, to which is added two ounces of borax and thoroughly mixing the same together in dry condition.

I then provide a solution "B" consisting in the proportion approximately of four quarts of water, two ounces of magnesium sulphate, two ounces of sulphuric acid, one ounce of chrome alum, one ounce of magnesium fluoride, and one hundred ounces of magnesium chloride. To the latter solution B there is then added and mixed therewith the mixture A in sufficient quantity to make it of a cream-like or pulpy consistency when there is added to and mixed therewith two ounces of China-wood oil and in such condition it is poured into molds conforming to the shape of the article to be produced, the China-wood oil being added to the mixture just previous to pouring the material into molds.

To produce artificial stone, for instance in simulation of marble mottled or veined, or having a mottled or a striated or veined surface, portions of the mixture are taken from the original batch mixed as described without any coloring material, the number of such portions depending upon whether the mottle or vein is to be of one, two or more colors or shades. Coloring material is then mixed with the remainder of the batch to give it the desired base color of the stone or marble to be produced and coloring material is mixed with the remaining portions to produce the desired color or shade of color of the mottle or vein and contrasting to the color of the body of the material.

Having thus described my invention, I claim:

1. A composition for producing molded artificial stone, consisting of a solution of water, magnesium sulphate, sulphuric acid, magnesium chloride, chrome alum and magnesium fluoride, having mixed therewith in quantity to produce a plastery mass having a cream-like consistency, a mixture of casein, a hydrous silicate, calcined magnesite, borax and an inert substance, and having added thereto a moisture proof material.

2. A composition for producing molded artificial stone, consisting of a solution of water, magnesium sulphate, sulphuric acid, magnesium chloride, chrome alum and magnesium fluoride, having mixed therewith in quantity to produce a plastery mass having a cream-like consistency, a mixture of casein, talcum, calcined magnesite, borax and sand, and having added thereto, just previously to pouring in the mold, China-wood oil.

CHARLES H. HAGOPIAN.